(12) United States Patent
Febrer et al.

(10) Patent No.: US 8,977,460 B2
(45) Date of Patent: Mar. 10, 2015

(54) METHOD OF MANAGING A DEVICE FOR DISTRIBUTING ENGINE TORQUE UPON A FAILURE OF ITS SELECTION BUTTON

(75) Inventors: Pascal Febrer, Paris (FR); Francois Foussard, Versailles (FR); Stephane Guegan, Versailles (FR); Alessandro Monti, La Garenne Colombes (FR)

(73) Assignee: RENAULT s.a.s., Boulogne-Billancourt (FR)

(*) Notice: Subject to any disclaimer, the term of this patent is extended or adjusted under 35 U.S.C. 154(b) by 182 days.

(21) Appl. No.: 13/640,942

(22) PCT Filed: Mar. 25, 2011

(86) PCT No.: PCT/FR2011/050639
§ 371 (c)(1),
(2), (4) Date: Nov. 9, 2012

(87) PCT Pub. No.: WO2011/128548
PCT Pub. Date: Oct. 20, 2011

(65) Prior Publication Data
US 2013/0054105 A1  Feb. 28, 2013

(30) Foreign Application Priority Data
Apr. 12, 2010 (FR) ..................... 10 52774

(51) Int. Cl.
*G06F 7/00* (2006.01)
*G06F 17/00* (2006.01)
(Continued)

(52) U.S. Cl.
CPC ........... *B60W 30/182* (2013.01); *B60W 10/119* (2013.01); *B60W 50/029* (2013.01);
(Continued)

(58) Field of Classification Search
CPC ..... B60W 10/06; B60W 20/00; B60W 10/11; B60W 30/18; B60W 30/18118; B60W 10/184; B60W 50/14; B60W 10/119; B60L 3/0023; B60L 7/06; B60L 10/06; B60L 9/005; B62D 5/04; B62D 6/00; B62D 15/00; B60K 6/547; B60K 1/02; B60K 6/48; B60K 23/0808; H01H 2300/018; H01H 71/505; H01H 31/00; H01H 9/26

USPC ............ 701/69, 51, 54, 58, 22, 2, 20, 55, 87; 318/587, 280, 447, 490, 800, 139, 560; 180/15, 65.285, 65.1, 412, 204, 446, 180/421, 405
See application file for complete search history.

(56) References Cited

U.S. PATENT DOCUMENTS 5,107,429 A * 4/1992 Sol .................................. 701/85
5,593,217 A * 1/1997 Schmitt et al. ................ 303/139
(Continued)

FOREIGN PATENT DOCUMENTS

EP    1 471 291    10/2004

OTHER PUBLICATIONS

U.S. Appl. No. 13/640,320, filed Oct. 10, 2012, Guegan, et al.
(Continued)

*Primary Examiner* — Calvin Cheung
*Assistant Examiner* — Luis A Martinez Borrero
(74) *Attorney, Agent, or Firm* — Oblon, McClelland, Maier & Neustadt, L.L.P.

(57) ABSTRACT

A method managing a device distributing engine torque between main and secondary wheel sets of a motor vehicle, the distributing device including an actuator distributing engine torque, a control unit exhibiting plural distribution modes of the engine torque and adopting one distribution mode as a function of a variable and a button selecting a distribution mode delivering an information item representative of the button position, the control unit determining, in regular operation, the variable, as a function of the information item; the method includes: detecting potential failure of the selection button, including verifying consistency of the information item; activation of degraded mode of operation, when a failure of the button is detected, in which a constant value is allocated to the variable; during degraded operation, monitoring end of failure, including verifying consistency of the information item; activation of regular mode of operation, when end of failure is detected.

11 Claims, 1 Drawing Sheet

(51) Int. Cl.
*G06F 19/00* (2011.01)
*B60W 30/182* (2012.01)
*B60W 10/119* (2012.01)
*B60W 50/029* (2012.01)
*B60W 50/08* (2012.01)
*B60K 23/08* (2006.01)

(52) U.S. Cl.
CPC .......... *B60W50/082* (2013.01); *B60K 23/0808* (2013.01); *B60W 2540/04* (2013.01); *B60W 2720/403* (2013.01)
USPC .................. 701/69; 701/51; 701/53; 701/54; 701/84

(56) References Cited

U.S. PATENT DOCUMENTS

| | | | | |
|---|---|---|---|---|
| 6,384,561 B1 * | 5/2002 | Niizuma et al. | .............. | 318/625 |
| 6,976,553 B1 * | 12/2005 | Dahl et al. | .................... | 180/247 |
| 7,220,209 B1 * | 5/2007 | Dahl et al. | .................... | 475/237 |
| 7,600,599 B1 * | 10/2009 | Dahl et al. | .................... | 180/249 |
| 8,016,724 B2 * | 9/2011 | Griesmeier et al. | .......... | 477/188 |
| 2002/0125094 A1 * | 9/2002 | Zimmermann et al. | ..... | 192/3.58 |
| 2004/0055567 A1 * | 3/2004 | Doelker et al. | ............... | 123/350 |
| 2004/0214688 A1 * | 10/2004 | Takasaki et al. | .............. | 477/115 |
| 2009/0069964 A1 * | 3/2009 | Wyatt et al. | ..................... | 701/22 |
| 2009/0171523 A1 * | 7/2009 | Luo et al. | ........................ | 701/22 |
| 2010/0120580 A1 * | 5/2010 | Mepham et al. | .................. | 477/3 |

OTHER PUBLICATIONS

French Search Report Issued Sep. 28, 2010 in FR 1052774 Filed Apr. 12, 2010.

International Search Report Issued Jun. 7, 2011 in PCT/FR11/50639 Filed Mar. 25, 2011.

* cited by examiner

METHOD OF MANAGING A DEVICE FOR DISTRIBUTING ENGINE TORQUE UPON A FAILURE OF ITS SELECTION BUTTON

TECHNICAL FIELD OF THE INVENTION

The invention relates to the field of motor vehicles provided with a plurality of wheel drive sets.

More precisely, the invention relates to motor vehicles provided with a device for distributing the engine torque between the front and rear sets of a vehicle having a plurality of drive axles and the strategies for managing the failures of a button for selecting the mode of distributing the engine torque of such a device.

PRIOR ART

Four-wheel drive vehicles comprise a front wheel set and a rear wheel set, one of which is a main wheel set and the other a secondary set. These vehicles comprise a first differential mounted on the front axle and a second differential mounted on the rear axle, a transmission connecting one of the differentials to the engine and a longitudinal transmission shaft which connects the two differentials via an actuator, for example, a clutch, for distributing the engine torque between the front and rear sets. The actuator is driven by a control unit delivering a torque distribution instruction signal.

Generally, these devices for distributing the engine torque have several modes for distributing the engine torque and comprise a selection button enabling the user to select the torque distribution mode that is desired.

For example, engine torque distribution devices generally have a "two-wheel drive" torque distribution mode wherein the engine torque is only distributed to the main wheel set, a "four-wheel drive—Road" operating mode and a "four-wheel drive—Off-road" operating mode.

In the prior art, when a failure of the control button is detected, the strategy that is adopted consists, most frequently, in activating a degraded operating mode wherein the torque distribution mode is a "two-wheel drive" mode. Therefore, in this case, a failure of the button inevitably causes the loss of the "four-wheel drive" functionalities of the vehicle.

Furthermore, the strategies of the prior art do not provide for monitoring, in degraded operation, the end of the failure, such that the vehicle can alternate in an untimely manner between degraded operation and nominal operation while the failure is not resolved.

Therefore, the strategies for managing the failures of the selection button are not fully satisfactory.

SUBJECT MATTER OF THE INVENTION

The aim of the invention is to overcome these problems by proposing a method of managing a device for distributing engine torque between two wheel sets managing the failures of the selection button such as to limit the inconveniences linked to a failure of the selection button.

To this end, and according to a first aspect, the invention proposes a method of managing a device for distributing engine torque between a main wheel set and a secondary wheel set of a motor vehicle, said distribution device comprising an actuator for distributing said engine torque, a control unit having several modes of distributing the engine torque and adopting one of these modes of distribution as a function of a variable V_position and a distribution mode selection button delivering an item of information representative of the position of said button, the control unit determining, in regular operation, the variable V_position, as a function of said item of information representative of the position of said button; said management method comprising:
- a step of detecting potential failure of the selection button during which the consistency of the item of information representative of the position of the button is checked;
- activation of degraded operation, when a failure of the selection button has been detected, wherein a constant value K is allocated to the variable V_position;
- in degraded operation, monitoring of failure end during which the consistency of the item of information representative of the position of the button is checked;
- activation of regular operation, when a failure end has been detected.

Therefore, the management method according to the invention provides for monitoring, in degraded operation, the end of a failure such that, as soon as the item of information delivered by the selection button is consistent again, the control unit returns to regular operation. Thus, the inconveniences brought about by a failure of the selection button can be limited.

This practice is all the more advantageous since in practice, when the user notices that the torque distribution mode does not correspond to the desired operation, the user will naturally tend to manipulate the button and to possibly solve the failure of the button, particularly when it is a failure linked to incorrect positioning of the button.

Advantageously, in regular operation, the driver can select a torque distribution mode from at least three torque distribution modes available in the control unit, namely at least a "two-wheel drive" torque distribution mode wherein the engine torque is only substantially distributed to the main wheel set, a "four-wheel drive—Road" distribution mode and a "four-wheel drive—Off-road" distribution mode, by placing the selection button in one indexed position from at least three including the positions "two-wheel drive", "four-wheel drive—Road" and "four-wheel drive—Off-road" corresponding to each of the engine torque distribution modes respectively.

Advantageously, the constant K which is allocated to the variable V_position, in degraded operation, is identical to the value which is allocated to the variable V_position, in regular operation, when the item of information delivered by the button is representative of the "four-wheel drive—Road" position.

Therefore, the vehicle continues to benefit from a four-wheel drive torque distribution mode when the selection button has a failure. Furthermore, the "four-wheel drive—Road" distribution mode is a mode that is suitable for the majority of driving conditions.

Advantageously, during the "four-wheel drive—Off-road" mode activation, the control unit remains locked in "four-wheel drive—Off-road" mode when the position variable V_position moves from a value representative of the "four-wheel drive—Off-road" position of the button to a value representative of the "four-wheel drive—Road" position of the button.

In this case, the choice of allocating to the variable V_position, in degraded operation, a value that is equivalent to that which would have been allocated thereto, in regular operation, for a "four-wheel drive—Road" position enables possible defects of the button to be put right, particularly when the button has return means for bringing the button back from the "four-wheel drive—Off-road" position thereof to the "four-wheel drive—Road" position thereof and when these return means tend to return the button to an intermediate position between the "two-wheel drive" position thereof and the "four-wheel drive—Road" position thereof. In such a case, the control unit still takes into account the request to move into "Off-road" mode despite this button fault.

Advantageously, the selection button is suitable for delivering an item of information representative of an intermediate position of the button between the "two-wheel drive" position thereof and the "four-wheel drive—Road" position thereof, and an intermediate position failure is detected when the item of information delivered by the button is representative of said intermediate position for a duration greater than T_intermediate_position.

Advantageously, an intermediate position failure end is detected when the item of information delivered by the button is again representative of a "two-wheel drive", "four-wheel drive—Road" or "four-wheel drive—Off-road" position. Therefore, following an intermediate position failure, as soon as the control unit detects a button positioning consistent item of information, the control unit returns to regular operation.

Advantageously, an inconsistent position failure is detected when the item of information delivered by the selection button is not representative of a position of said button.

Advantageously, an inconsistent position failure end is detected when the item of information delivered by the button is again representative of a "two-wheel drive" then "four-wheel drive—Road" position, or vice versa. Therefore, the control unit must detect simultaneously an item of information representative of a "two wheel" position and an item of information representative of a "four-wheel drive—Road" position before returning to regular operation.

Advantageously, the selection button comprises a return means for automatically bringing the button back from the "four-wheel drive—Off-road" position thereof to the "four-wheel drive—Road" position thereof, in that the control unit is locked in "four-wheel drive—Off-road" mode during the return of the button into the "four-wheel drive—Road" position and in that an Off-road position failure is detected when the item of information delivered by the actuator is representative of the "four-wheel drive—Off-road" position for a duration greater than T_off-road_position.

Advantageously, the "four-wheel drive—Off-road" mode of the control unit is unlocked when an Off-road position failure is detected.

Advantageously, an Off-road position failure end is detected when the item of information delivered by the actuator is no longer representative of the "four-wheel drive—Off-road" position.

BRIEF DESCRIPTION OF THE FIGURES

Further subject matter and advantages of the invention will emerge in the course of the following description with reference to the appended drawings, wherein.

EMBODIMENTS

As disclosed above, the invention relates to the distribution of the engine torque between the wheel sets of a vehicle having several drive sets, such as a 4×4 vehicle. Such a vehicle includes at least one front wheel set on which are mounted two front wheels and a rear wheel set on which are mounted two rear wheels. One of the wheel sets is the main set and the other is the secondary set. The vehicle comprises a transmission connecting the engine to a first differential mounted on the main set and a transmission longitudinal shaft connecting the first differential to a second differential mounted on the secondary set via a torque distribution device.

Figure 1:
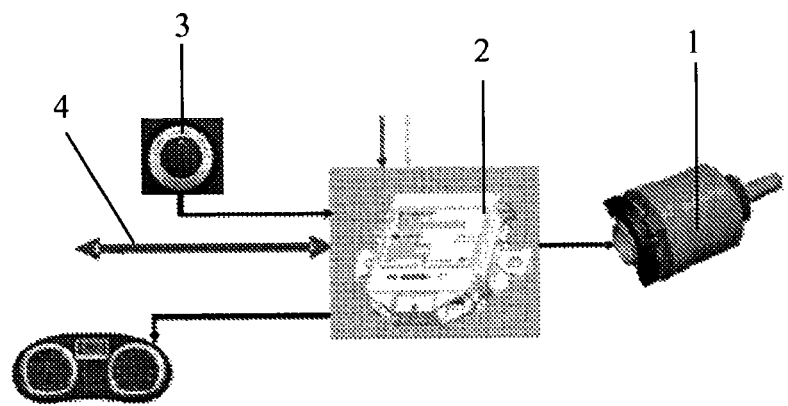
FIG. 1 is a schematic view of an engine torque distribution device and of the peripherals thereof.

According to the invention, the vehicle has a torque distribution device, illustrated in FIG. 1. The device comprises an electromechanical actuator 1 provided with a clutch device such as to vary the distribution of the engine torque between the axles. This actuator 1 is controlled by an appropriate control unit 2.

The control unit 2 is a computer comprising a microcontroller, a random access memory (RAM), and read-only memories (ROM and EEPROM) which contain an algorithm for driving the actuator 1. This control unit 2 is connected to a communication bus such as to obtain the vehicle operating items of information. The control unit 2 is particularly connected to the engine control electronic module, to the braking system regulating module and/or to the stability electronic control module, via a communication bus 4, typically a CAN bus. The control unit 2 is powered by the battery of the vehicle.

The control unit 2 has at least three separate engine torque distribution modes: a "two-wheel drive" mode, a "four-wheel drive—Road" mode and a "four-wheel drive—Off-road" mode.

In two-wheel drive mode, the torque is only substantially distributed to the main wheel set. It should be noted that, in some vehicles, the control unit 2 proposes a function wherein, in two-wheel drive mode, a minimum torque is applied to the secondary wheel set such as to limit the parasitic noise generated by the secondary shaft transmission means when no torque is applied thereto. Therefore, in this case "torque only substantially distributed to the main wheel set" means a low secondary shaft transmission rate, typically less than 10%.

The "four-wheel drive—Road" and "four-wheel drive—Off-road" modes correspond to two different torque distribution strategies, the first being focused on seeking better on-road behavior whereas the second is focused rather on seeking better behavior in off-road mode, particularly while seeking optimal grip.

For example, in "four-wheel drive—Road" mode, the control unit 2 drives the actuator 1 as a function of the difference in rotatary speed observed between the main and secondary wheel sets, whereas in "four-wheel drive—Off-road" mode, the control unit 2 drives the actuator 1 such that the distribution rate between the main wheel set and the secondary wheel set is substantially constant.

The control unit 2 adopts one of the torque distribution modes thereof as a function of a variable V_position. In regular operation, the control unit 2 determines the value of the variable V_position, as a function of an item of information representative of the position of a button 3 for selecting the distribution mode.

This selection button 3 has at least three positions each corresponding to one of the torque distribution modes, namely a "two-wheel drive" position, a "four-wheel drive—Road" position and a "four-wheel drive—Off-road" position. The "four-wheel drive—Road" position is located between the "two-wheel drive" position and the "four-wheel drive—Off-road" position.

This button 3 enables the user to select the engine torque distribution mode that suits the latter. To this end, in regular operation, the driver can select a torque distribution mode by placing the selection button 2 in the corresponding position thereof.

Figure 2:
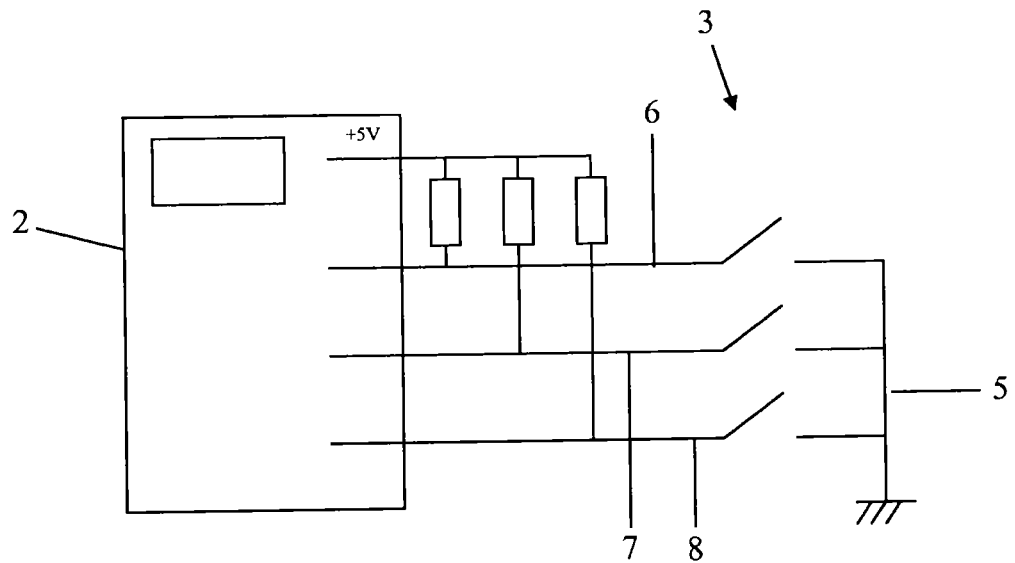
FIG. 2 is a schematic view of a button for selecting the mode of distributing the engine torque.

In one particular embodiment illustrated in FIG. 2, a selection button 3 comprises four separate tracks 5, 6, 7, 8 and moveable metal brushes or tabs for bringing into contact these tracks 5, 6, 7, 8 according to the position of the button 2.

A first track 5 corresponds to the ground, a second so-called "two-wheel drive" track 6 corresponds to the track that is connected to the ground 5 when the button 3 is in the two-wheel drive position, a third so-called "four-wheel drive—Road" track 7 is connected to the ground 5 when the button 3 is in the corresponding position thereof and a fourth so-called "four-wheel drive—Off-road" track 8 is connected to the ground 5 when the button 3 is in the corresponding position thereof.

It is noted that, in the embodiment described below, the "four-wheel drive—Road" track 7 is also connected to the ground 5 when the button is in the "four-wheel drive—Off-road" position. It will be noted, furthermore, that the button 3 has, between the "two-wheel drive" position thereof and the "four-wheel drive—Road" position thereof, an intermediate position wherein the second "two-wheel drive" track 6 and the third "four-wheel drive—Road" track 7 are connected to the ground 5.

Therefore, in regular operation, the control unit 2 allocates the following values to the variable V_position when it receives the items of information that are representative of the positioning of the button 3 which are indicated in the following tables:

V_position=two-wheel drive position:

| Tracks | State (Contact = 1, No contact = 0) |
|---|---|
| 4 * 2 | 1 |
| Road | 0 |
| Off-road | 0 |

V_position=Intermediate position between the two-wheel drive position and the road position:

| Tracks | State (Contact = 1, No contact = 0) |
|---|---|
| 4 * 2 | 1 |
| Road | 1 |
| Off-road | 0 |

V_position=Four-wheel drive—Road position:

| Tracks | State (Contact = 1, No contact = 0) |
|---|---|
| 4 * 2 | 0 |
| Road | 1 |
| Off-road | 0 |

V_position=Four-wheel drive—Off-road position:

| Tracks | State (Contact = 1, No contact = 0) |
|---|---|
| 4 * 2 | 0 |
| Road | 1 |
| Off-road | 1 |

The control unit 2 adopts then the torque distribution mode as a function of the variable V_position.

It is furthermore noted that the button 3 is arranged such that the "two-wheel drive" and "four-wheel drive—Road" positions are stable positions whereas the "Off-road" position is an impulse position, the button 3 being automatically returned by return means from the "Off-road" position thereof to the "Road" position thereof.

The control unit 2 remains in "four-wheel drive—Off-road" mode when the position variable V_position moves from a value representative of the "four-wheel drive—Off-road" position of the button 3 to a value representative of the "four-wheel drive—Road" position of the button 3. The control unit 2 is locked in "four-wheel drive—Off-road" mode as long as it does not receive an item of information from the button 3, which is representative of the "two-wheel drive" position or as long as an event causing the "four-wheel drive—Off-road" mode to be unlocked has not taken place.

In practice, the control unit 2 moves from the "Off-road" mode to the "Road" mode, when the ignition is switched off for a duration greater than TJock (this duration must be greater than the duration necessary for starting the engine after stalling which is approximately 30 seconds). Indeed, in "four-wheel drive—Off-road" mode, in the case of the ignition being switched off and in particular after engine stalling (frequent with off-road use), the "Off-road" mode is stored and retained if the driver switches on the ignition again, then restarts in a time interval that is less than TJock. If the ignition remains switched off beyond this duration, the control unit considers that this is a different task and restarts in "four-wheel drive—Road" mode.

Furthermore, when the vehicle continuously exceeds a speed threshold V_locking_end for a minimum duration T_speed_locking_end, the control unit also returns to "four-wheel drive—Road" mode.

Furthermore, it is also possible to unlock the "Off-road" mode to return to "Road" mode by returning to the "four-wheel drive—Off-road" position when the control unit 2 is already in "four-wheel drive—Off-road" mode.

Therefore, the control unit adopts the "two-wheel drive" mode when V_position=two-wheel drive position, adopts the "four-wheel drive—Road" mode when V_position=four-wheel drive—Road position and the control unit is not locked in "four-wheel drive—Off-road" mode, and adopts the "four-wheel drive—Off-road" mode when V_position=four-wheel drive—Off-road and the control unit 2 was previously in "four-wheel drive—Road" mode.

Furthermore, the control unit 2 adopts the "four-wheel drive—Road" mode when V_position=four-wheel drive—Off-road position and the control unit comes from the "four-wheel drive—Off-road" mode.

The method according to the invention provides for detection of the potential failures of the selection button 3. To this end, the control unit 2 checks the consistency of the item of information representative of the position of the button 3 that it receives.

The control unit 2 particularly checks if the item of information delivered by the selection button 3 is not representative of a position of said button 3. If the item of information delivered by the selection button does not represent one of the indexed positions of the button 3 for a duration greater than Tjnconsistency, an inconsistent position failure is detected. For example, Tjnconsistency is in the region of 100 milliseconds.

The various items of information which can be delivered by the button 3 and which do not correspond to possible positions of the button 3 are illustrated in the following table:

| Tracks | State (Contact = 1, No contact = 0) | | | |
|---|---|---|---|---|
| 4 * 2 | 0 | 0 | 1 | 1 |
| Road | 0 | 0 | 0 | 1 |
| Off-road | 0 | 1 | 1 | 1 |

These states correspond to a disconnection of the button 3 or to a short circuit between the tracks 5, 6, 7 and/or 8.

Furthermore, the control unit 2 also checks that the button 3 is not locked in the "four-wheel drive—Off-road" position for too long a duration. Indeed, as mentioned above, the "four-wheel drive—Off-road" position is an unstable impulse position since a return means automatically brings the selection button 3 back to the "four-wheel drive—Road" position thereof. Therefore, with regular operation of the button 3, the latter should only remain in the "four-wheel drive—Off-road" position for a very short time.

Therefore, an Off-road position failure is detected when the item of information received by the control unit is, for a duration greater than T_off-road_position, representative of a positioning of the selection button in the unstable "four-wheel drive—Off-road" position. Typically, T_off-road_position is approximately 10 seconds.

When an Off-road position failure is detected, the control unit 3 unlocks the "four-wheel drive—Off-road" mode.

Furthermore, a failure is also detected when the button 3 remains for an abnormally long time in an intermediate unstable position between the "two-wheel drive" position thereof and the "four-wheel drive—Road" position thereof. Therefore, an intermediate position failure is detected when the item of information delivered by the button is representative of said intermediate position for a duration greater than T_intermediate_position. Typically, T_intermediate_position is approximately 10 seconds.

According to the invention, degraded operation is activated as soon as a failure of the selection button has been detected. In degraded operation, a constant value K is allocated to the variable V_position and the control unit adopts then one of the distribution modes as a function of this constant.

Preferably, the constant K which is allocated to the variable V_position, in degraded operation, is identical to the value which is allocated to the variable V_position, in regular operation, when the item of information delivered by the button 3 is representative of the "four-wheel drive—Road" position. In other words, V_position=K=four-wheel drive—Road position.

This choice is particularly advantageous. Indeed, firstly, the vehicle continues to benefit from a four-wheel drive torque distribution mode when the selection button 3 has a failure.

Secondly, this choice enables possible defects of the button 3 to be put right. Indeed, some buttons have mechanical defects such that the return means for bringing the button back from the "four-wheel drive—Off-road" position thereof to the "four-wheel drive—Road" position thereof tend to return the button to an intermediate position between the "two-wheel drive" position thereof and the "four-wheel drive—Road" position thereof. In such an instance, an intermediate position failure is detected, and allocated to the variable V_position is a value equivalent to that which would have been allocated thereto, in regular operation, for a "four-wheel drive—Road" position of the button 3. Therefore, the request to move into "Off-road" mode is indeed taken into consideration by the control unit 2.

Furthermore, according to the invention, in degraded operation, the end of the detected failure is monitored by checking the consistency of the item of information representative of the position of the button 3. When a failure end has been detected, the control unit reactivates regular operation.

In practice, when the user detects that the torque distribution mode does not correspond to the operation as desired, the user will naturally tend to manipulate the button 3. In some cases, this manipulation will be sufficient for the failure of the button 3 to be resolved and, consequently, for the control unit 2 to return to regular operation.

The control unit 2 detects an inconsistent position failure end when the item of information delivered by the button 3 is again representative of a "two-wheel drive" then "four-wheel drive—Road" position, or vice versa.

Furthermore, the control unit 2 detects an intermediate position failure end when the item of information delivered by the button 3 is again representative of a "two-wheel drive", "four-wheel drive—Road" or "four-wheel drive—Off-road" position.

Finally, the control unit 2 detects an Off-road position failure end when the item of information delivered by the button 3 is no longer representative of the "four-wheel drive—Off-road" position.

The invention is described above by way of example. Of course, a person skilled in the art can carry out various alternative embodiments of the invention without necessarily departing from the scope of the invention.

The invention claimed is:

1. A method of managing a device for distributing engine torque between a main wheel set and a secondary wheel set of a motor vehicle, the device including an actuator for distributing the engine torque, a control unit including a plurality of modes of distributing the engine torque and a button delivering an item of information representative of a position of the button, the management method comprising:
   determining, by the control unit and in regular operation, a variable as a function of the item of information representative of the position of the button;
   adopting, by the control unit, one of the plurality of modes of distribution as a function of the variable;
   detecting, by the control unit, potential failure of the button during which consistency of the item of information representative of the position of the button is checked;
   activating, by the control unit, a degraded operation when a failure of the button is detected, wherein a constant value is allocated to the variable;
   monitoring, by the control unit and in the degraded operation, a failure end during which the consistency of the item of information representative of the position of the button is checked; and
   activating, by the control unit, regular operation when the failure end is detected,
   wherein an inconsistent position failure is detected when the item of information delivered to the control unit by the button is not representative of a position of the button.

2. The method as claimed in claim 1, wherein, in regular operation, the driver can select a torque distribution mode from at least three torque distribution modes available in the control unit, the at least three torque distribution modes including at least a two-wheel drive torque distribution mode in which the engine torque is only substantially distributed to the main wheel set, a four-wheel—drive Road distribution mode, and a four-wheel drive—Off-road distribution mode, by placing the button in one indexed position from at least three positions including two-wheel drive, four-wheel drive—Road, and four-wheel drive—Off-road positions corresponding to each of the engine torque distribution modes respectively.

3. The method as claimed in claim 2, wherein the button is configured to deliver an item of information representative of an intermediate position of the button between the two-wheel drive position thereof and the four-wheel drive—Road position thereof, and wherein an intermediate position failure is detected when the item of information delivered by the button is representative of the intermediate position for a duration greater than a predetermined duration.

4. The method as claimed in claim 3, wherein an intermediate position failure end is detected when the item of information delivered by the button is again representative of a two-wheel drive, four-wheel drive—Road, or four-wheel drive—Off-road position.

5. The method as claimed in claim 2, wherein an inconsistent position failure end is detected when the item of information delivered by the button is again representative of a two-wheel drive position and then a four-wheel drive—Road position, or vice versa.

6. The method as claimed in claim 2, wherein
  the button includes a return selector configured to automatically bring the button back from the four-wheel drive—Off-road position thereof to the four-wheel drive—Road position thereof,
  the control unit is locked in four-wheel drive—Off-road mode during the return of the button into the four-wheel drive—Road position, and
  an Off-road position failure is detected when the item of information is representative of the four-wheel drive—Off-road position for a duration greater than a predetermined period.

7. The method as claimed in claim 6, wherein the four-wheel drive—Off-road mode of the control unit is unlocked when an Off-road position failure is detected.

8. The method as claimed in claim 6, wherein a locked position failure end is detected when the item of information is no longer representative of the four-wheel drive—Off-road position.

9. The method as claimed in claim 1, wherein the constant which is allocated to the variable, in degraded operation, is identical to a value which is allocated to the variable, in regular operation, when the item of information delivered by the button is representative of the four-wheel drive—Road position.

10. The method as claimed in claim 9, wherein, during activation of the four-wheel drive—Off-road mode, the control unit remains locked in the four-wheel drive—Off-road mode when the variable moves from a value representative of the four-wheel drive—Off-road to a value representative of the four-wheel drive—Road.

11. A device for distributing engine torque between a main wheel set and a secondary wheel set of a motor vehicle, the device comprising:
  an actuator for distributing the engine torque;
  a control unit including a plurality of modes of distributing the engine torque; and
  a button delivering an item of information representative of a position of the button,
 wherein the control unit is configured to
 determine, in regular operation, a variable as a function of the item of information representative of the position of the button;
 adopt, one of the plurality of modes of distribution as a function of the variable;
 detect potential failure of the button during which consistency of the item of information representative of the position of the button is checked;
 activate a degraded operation when a failure of the button is detected, wherein a constant value is allocated to the variable;
 monitor, in the degraded operation, a failure end during which the consistency of the item of information representative of the position of the button is checked; and
 activate regular operation when the failure end is detected, p1 wherein an inconsistent position failure is detected when the item of information delivered by the button is not representative of a position of the button.

* * * * *